(12) United States Patent
Rutland et al.

(10) Patent No.: US 10,142,684 B2
(45) Date of Patent: Nov. 27, 2018

(54) PINNING ENCRYPTION METADATA TO SEGMENT URIS

(71) Applicant: Cisco Technology, Inc., San Jose, CA (US)

(72) Inventors: Paul Rutland, Eastleigh (GB); John Allen, Chandler's Ford (GB)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/464,373

(22) Filed: Mar. 21, 2017

(65) Prior Publication Data
US 2018/0278990 A1 Sep. 27, 2018

(51) Int. Cl.
| | |
|---|---|
| H04N 21/44 | (2011.01) |
| H04L 9/32 | (2006.01) |
| H04L 29/06 | (2006.01) |
| H04N 21/262 | (2011.01) |
| H04N 21/4408 | (2011.01) |

(Continued)

(52) U.S. Cl.
CPC ....... *H04N 21/4408* (2013.01); *H04L 9/0643* (2013.01); *H04L 9/14* (2013.01); *H04L 9/30* (2013.01); *H04L 9/3247* (2013.01); *H04L 65/608* (2013.01); *H04L 67/02* (2013.01); *H04L 67/146* (2013.01); *H04N 21/25816* (2013.01); *H04N 21/435* (2013.01)

(58) Field of Classification Search
CPC ....... H04N 21/4408; H04L 9/14; H04L 63/04; H04L 63/0428; H04L 63/12; H04L 63/123; G06F 21/60–21/604
See application file for complete search history.

(56) References Cited

U.S. PATENT DOCUMENTS

| | | | |
|---|---|---|---|
| 8,707,442 B1 * | 4/2014 | Lax | G06F 17/30887 726/26 |
| 8,806,193 B2 | 8/2014 | Swaminathan et al. | |

(Continued)

OTHER PUBLICATIONS

Josefsson, S.; The Base16, Base32, and Base64 Data Encodings, Network Working Group—RFC4648; Oct. 2006.

(Continued)

*Primary Examiner* — Brian T Pendleton
*Assistant Examiner* — Frank Johnson
(74) *Attorney, Agent, or Firm* — Merchant & Gould P.C.

(57) ABSTRACT

In one embodiment, a method, comprising obtaining a first uniform resource identifier for a segment of a content item, obtaining encryption metadata indicative of encryption information to be used for encrypting the segment when the segment is requested by a client device or a content delivery network, generating a data combination based on the first uniform resource identifier and the encryption metadata, generating an authentication code or a signature by applying a secret to the data combination, the secret being unknown to the client device or the content delivery network, generating a second uniform resource identifier for the segment based on the authentication code or the signature, the encryption metadata and the first uniform resource identifier, inserting the second uniform resource identifier in an adaptive bitrate media playlist for the content item, and sending the adaptive bitrate media playlist to the client device or the content delivery network.

20 Claims, 4 Drawing Sheets

(51) Int. Cl.
*H04L 29/08* (2006.01)
*H04N 21/435* (2011.01)
*H04N 21/258* (2011.01)
*H04L 9/14* (2006.01)
*H04L 9/06* (2006.01)
*H04L 9/30* (2006.01)

(56) References Cited

U.S. PATENT DOCUMENTS

| | | | |
|---|---|---|---|
| 8,887,214 | B1 | 11/2014 | Black et al. |
| 8,983,076 | B2 | 3/2015 | Swaminathan et al. |
| 9,075,962 | B1* | 7/2015 | Lau ............... H04L 63/123 |
| 9,124,672 | B2 | 9/2015 | Losev et al. |
| 9,392,075 | B1* | 7/2016 | Radovnikovic ......... G06F 21/31 |
| 9,497,514 | B2 | 11/2016 | Moroney et al. |
| 2013/0097644 | A1* | 4/2013 | Brande ............ H04N 21/6408 |
| | | | 725/93 |
| 2013/0198335 | A1 | 8/2013 | Goel et al. |
| 2013/0275549 | A1 | 10/2013 | Field et al. |
| 2013/0332971 | A1* | 12/2013 | Fisher ............... H04N 21/266 |
| | | | 725/93 |
| 2015/0046714 | A1 | 2/2015 | Knox et al. |
| 2015/0326948 | A1* | 11/2015 | Des Jardins ...... G06F 17/30029 |
| | | | 725/32 |
| 2016/0198202 | A1* | 7/2016 | Van Brandenburg ..................... |
| | | | H04N 21/26258 |
| | | | 725/31 |

OTHER PUBLICATIONS

Krawczyk, H. et al.; "HMAC: Keyed-Hashing for Message Authentication" Network Working Group—RFC2104; Feb. 1997.

Ma, Kevin J. et al.; "DRM workflow analysis for over-the-top HTTP segmented delivery," 2011 IEEE International Conference on Multimedia and Expo, Barcelona, 2011, pp. 1-4.

Pantos, R., et al.; "HTTP Live Streaming" (draft-pantos-http-live-streaming-19) IETF, Apr. 4, 2016.

* cited by examiner

PINNING ENCRYPTION METADATA TO SEGMENT URIS

TECHNICAL FIELD

The present disclosure generally relates to adaptive bitrate streaming.

BACKGROUND

Adaptive Bitrate (ABR) Streaming of media, e.g. over a content delivery network has been widely adopted for media consumption. Various protocols for such streaming have been proposed, and are often associated with various providers of hardware or software. For example, the HTTP Live Streaming (HLS) protocol has been put forth by Apple, and is typically associated with Apple devices, such as iPhones, iPads, and so forth. Likewise, the HTTP Smooth Streaming (HSS) protocol has been proposed by Microsoft, and is accordingly often associated with Microsoft products, such as Windows Phone and Silverlight. The HTTP Dynamic Streaming (HDS) protocol is associated with Adobe and Adobe products, such as Flash Player and Flash Media Server. MPEG DASH (Dynamic Adaptive Streaming over HTTP, ISO/IEC 23009-1:2012) was put forward by the MPEG standards body as yet another alternative standard ABR protocol.

It is appreciated that each of these protocols may be supported on hardware or by software produced by one of these bodies, even though that particular hardware or software may be produced by one particular provider, and the ABR format associated with a different provider. By way of example, a device running a Microsoft operating system may display streamed content which is streamed using the HDS protocol of Adobe.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

There is provided, in accordance with some embodiments of the presently disclosed subject matter a method including obtaining a first uniform resource identifier for a segment of a content item, obtaining encryption metadata indicative of encryption information to be used for encrypting the segment when the segment is requested by a client device or a content delivery network, generating a data combination based on the first uniform resource identifier and the encryption metadata, generating an authentication code or a signature by applying a secret to the data combination, the secret being unknown to the client device or the content delivery network, generating a second uniform resource identifier for the segment based on the authentication code or the signature, the encryption metadata and the first uniform resource identifier, inserting the second uniform resource identifier in an adaptive bitrate media playlist for the content item, and sending the adaptive bitrate media playlist to the client device or the content delivery network.

There is further provided, in accordance with some embodiments of the presently disclosed subject matter a method including receiving a uniform resource identifier for a segment of a content item from a client device or a content delivery network, wherein the uniform resource identifier is indicative of encryption metadata, an authentication code or signature, and segment identification, determining the authentication code or the signature based on the uniform resource identifier, and validating the authentication code or the signature, determining the encryption metadata based on the uniform resource identifier, and using the encryption metadata to obtain encryption information, determining the segment identification based on the uniform resource identifier, and using the segment identification to obtain the segment, using the encryption information to encrypt the segment, and sending the segment, encrypted, to the client device or the content delivery network.

EXAMPLE EMBODIMENTS

Some of the following embodiments describes the subject matter with reference to HLS, as an example of an ABR protocol. However, any other suitable ABR protocol may be used for implementing the subject matter, mutatis mutandis.

Figure 1:
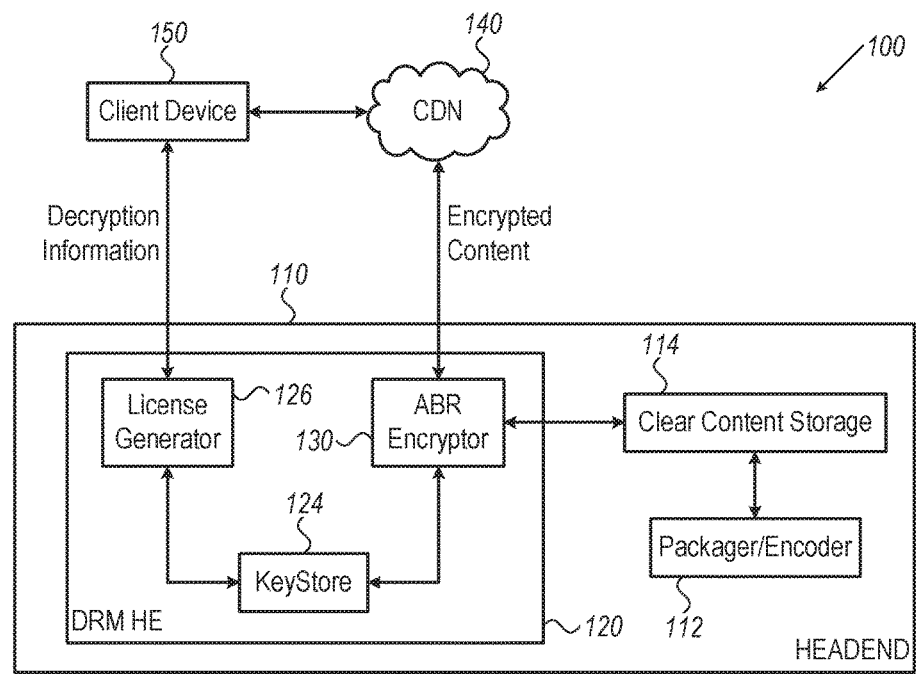
FIG. 1 is a block diagram of a system, in accordance with some embodiments of the presently disclosed subject matter.

Reference is now made to FIG. 1 which is a block diagram of a system 100, in accordance with some embodiments of the presently disclosed subject matter.

System 100 includes a headend 110 (e.g. including one or more servers), a content delivery network (CDN) 140 and a client device 150. Although a single CDN 140 and a single client device 150 are illustrated in FIG. 1, system 100 may include one or more client devices 150, and may include zero, one, or more CDNs 140. For instance, CDN(s) 140 may be included in system 100 in order to provide higher scalability. Headend 110 provides content to client device(s) 150, optionally via CDN(s) 140. For simplicity's sake, the subject matter will be described herein for the most part with reference to a single client device 150 and sometimes a single CDN 140.

Headend 110 may vary depending on the embodiment. In some embodiments, headend 110 is an Over-The-Top (OTT) video system which provides just in time Digital Rights Management (DRM) encryption. Additionally or alternatively in some embodiments, headend 110 may be operated by any entity that encrypts content (e.g. OTT content), such as a vendor of CDN 140, a streaming company, etc.

In the embodiment illustrated in FIG. 1, headend 110 includes one or more packager/encoders 112, one or more clear content storages 114, and one or more DRM headends 120. Reference herein to packager/encoder 112 (or clear content storage 114 or DRM headend 120) in the single form should be understood as covering embodiments where there is a single packager/encoder 112 (or clear content storage 114 or DRM headend 120) and embodiments where there is a plurality of packager/encoders 112 (or clear content storages 114 or DRM headends 120). DRM headend 120 includes one or more keystores 124, one or more license generators 126 and one or more ABR encryptors 130. Typically although not necessarily, keystore(s) 124 and license generator(s) 126 are on separate server(s) from ABR encryptor(s) 130. Reference herein to keystore 124 (or license generator 126 or ABR encryptor 130) in the single form should be understood as covering embodiments where there is a single keystore 124 (or license generator 126 or ABR encryptor 130) and embodiments where there is a plurality of keystores 124 (or license generators 126 or ABR encryptors 130).

Headend 110 may be concentrated in one location or may be distributed over a plurality of locations. For instance, different elements in headend 110 may be located in different data centers, preferably with secure and high bandwidth/low latency connections. In some embodiments where headend 110 is distributed (e.g. in the United States), clear content storage 114 and packager/encoder 112 may be deployed in a more central location (e.g. in the central or mountain time zone), whereas different DRM headends 120 may be deployed closer to various locations of client devices 150 (e.g. deployed in a location in the eastern time zone and deployed in a location in the pacific time zone).

A content item includes any suitable data, for example, visual data, audio data, and/or metadata. The content item, which is live or from a pre-recorded source is stored in clear content storage 114, thus allowing the content item to potentially be reused in different formats (e.g. different encoding formats for OTT content) and to be packaged dynamically by a packager/encoder 112. The content item is encoded as MPEG-2, MPEG-4, MP3, AC-3 and/or any other suitable format. In accordance with an ABR protocol, packager/encoder 112 typically encodes a content item to a single stream configured for a single output bitrate or to multiple streams configured for a range of output bitrates. Packager/encoder 112 also generates ABR playlist(s) for the content item. For example, packager/encoder 112 may generate an ABR master (also referred to as "main") playlist and ABR media playlist(s) for the content item. The ABR master playlist references ABR media playlist(s) that contain respective listing(s) of segments which when played sequentially will play the content item. Additionally or alternatively, packager/encoder 112 may not generate an ABR master playlist for the content item, but may only generate ABR media playlist(s) for the content item, the ABR media playlist(s) containing respective list(s) of segments which when played sequentially will play the content item. The term "ABR" as used herein with reference to an ABR master playlist or to an ABR media playlist refers to a playlist generated in accordance with an ABR protocol, regardless of whether the content item is encoded at a single bitrate and a single ABR media playlist is generated, or the content item is encoded at multiple bitrates and a plurality of ABR media playlists are generated. Each generated ABR media playlist for a content item describes a particular version (i.e. a particular stream) of the content item, specifying the content item encoded at a particular bitrate, in a particular format, and at a particular resolution (if containing video).

Clear segments (also referred to as unencrypted, or raw) and playlists generated by packager/encoder 112 are stored in clear content storage 114. In system 100, client device 150 does not have access to segments and playlists that are stored in clear content storage 114, except via ABR encryptor 130, as will be explained in more detail below.

Those skilled in the art will appreciate that the terms "segment", "fragment" and "chunk" are used interchangeably in the ABR realm. Typically, the term "segment" is used in discussing HLS and DASH, while the term "fragment" is used in discussions about HSS and HDS. Accordingly, the terms "segment, "fragment" and "chunk", in all of their various forms, are understood herein to be referring to the same thing, unless otherwise explicitly noted. It is also appreciated that the terms "playlist", "index file" and "manifest" are used interchangeably in the ABR realm. Typically, the term "playlist" is used in discussing HLS, while the term "manifest" is used in discussions about HSS, DASH, and HDS. Accordingly, the terms "playlist", "index file" and "manifest", in all of their various forms, are understood herein to be referring to the same thing, unless otherwise explicitly noted. It is further appreciated that the functionalities of encoding and packaging may instead be performed by a separate encoder and a separate packager, respectively.

An exemplary ABR media playlist, in its most basic form (e.g. M3U file, UTF-8 text file, etc.), typically comprises heading information followed by tags. For example, for a live HLS media playlist the tag EXT-X-PROGRAM-DATE-TIME associates the first sample of a media segment (whose specification follows the tag) with an absolute date and/or time. For another example, tags in an HLS media playlist may include EXTINF as follows:

EXTINF:10.0,
http://Chan1/stream1/seg72.ts
EXTINF:10.0,
http://Chan1/stream1/seg73.ts Each EXTINF is a record marker that describes the segment identified by the Uniform Resource Identifier (URI) that follows it. The format of the URI may vary depending on the embodiment, and the format shown above is but one example of a format. The EXT INF tag contains a "duration" attribute (e.g., that is an integer or floating-point number in decimal positional notation) that specifies the duration of the segment, e.g., in seconds. In the above example, the duration of each of the segment 72 and segment 73 is 10.0 seconds.

ABR encryptor 130 inserts a key tag in an ABR media playlist which allow client device 150 to look up decryption information (e.g. decryption key and/or initialization vector "IV", etc.) for a segment. In order that ABR encryptor 130 may encrypt the segment when the segment is requested by client device 150 or CDN 140, ABR encryptor 130 also inserts in the ABR media playlist a segment URI generated based on encryption metadata. The encryption metadata is indicative of the encryption information (e.g. encryption key and/or IV, etc.) that matches the decryption information indicated by the key tag. The ABR media playlist is sent to client device 150 or CDN 140.

The inserted key tag that is associated with the segment identifies a particular DRM license. Client device 150 provides a key identifier (key ID) included in such a key tag to license generator 126, and license generator 126 uses the key identifier to fetch decryption information (e.g. the decryption key and/or initialization vector ("IV"), etc.) for the segment from keystore 124. License generator 136 then provides the decryption information to client device 150 and client device 150 uses the decryption information for decrypting the segment after the segment is received, encrypted, from ABR encryptor 130.

Client device 150, or CDN 140 on behalf of client device 150, requests the segment, including sending a URI for the segment (e.g. the URI listed in the ABR media playlist for the segment) to ABR encryptor 130. ABR encryptor 130 determines the encryption metadata based on the URI, and uses the encryption metadata to obtain the encryption information for the segment. ABR encryptor 130 uses the encryption information to encrypt the segment. The encryption of the segment therefore takes place on demand when the segment is requested (also referred to as "just in time encryption"). The segment, encrypted, is sent by ABR encryptor 130 to CDN 140 or to client device 150. It is noted that having ABR encryptor 130 determine the encryption metadata based on a URI when the segment is requested, and use the encryption metadata to obtain encryption information for encrypting the segment, may be advantageous compared to alternatives for encrypting the segment when the segment is requested. Some advantages will be described in more detail below.

ABR encryptor 130 may include one or more servers that act as proxy server(s) (e.g. trusted reverse proxy server(s)) on behalf of client device 150 and CDN 140, because client device 150 and CDN 140 are not permitted to directly access clear content storage 114. The term "reverse" is also be referred to as pull mode. When ABR encryptor 130 includes a plurality of servers (e.g. where a particular server may be implemented in a separate virtual machine and/or container, separate from other servers, or the particular server may be implemented in separate processor(s), separate from other servers), the servers may not necessarily all be powered on at the same time, and each server may not necessarily be aware of the existence of other servers, as communication between the various servers is not required. In embodiments where ABR encryptor 130 includes a plurality of servers, a URI of a segment that is sent by client device 150 or CDN 140 may be received by the same server of ABR encryptor 130 which sent an ABR media playlist describing the segment to client device 150 or CDN 140, or may be processed by a different server of ABR encryptor 130.

In some embodiments, elements of system 100, other than ABR encryptor 130, may be equivalent to parallel elements of a system which does not implement URIs that are indicative of encryption metadata, if such equivalence is advantageous. Such equivalence may be advantageous for instance to avoid modification of previously existing elements when implementing system 100. In such embodiments, ABR encryptor 130 may be adapted in order to implement system 100, and therefore may be different than a parallel element in a system which does not implement URIs that are indicative of encryption metadata. However, in other embodiments, where packager/encoder 112 is integrated with ABR encryptor 130, the integrated packager/encoder/encryptor may be adapted in order to implement system 100, and therefore may be different than parallel element(s) in a system which does not implement URIs that are indicative of encryption metadata.

In some embodiments, system 100 includes more, less and/or different elements than shown in FIG. 1. Each of the elements of system 100 includes appropriate hardware, software and/or firmware to perform the operations attributed to the element herein. Some examples of appropriate hardware, software and/or firmware for certain elements will be provided further below. Operation(s) attributed to an element of system 100 herein should not be considered binding and in some embodiments, other element(s) in system 100 may additionally or alternatively perform such operation(s).

Methods will now be described with reference to FIGS. 2 to 4. Prior to executing the methods described with reference to FIGS. 2 and 4, ABR encryptor 130 optionally requests (e.g. at start-up of ABR encryptor 130) encryption keys and secret(s) from keystore 124 and/or secret(s) (e.g. Hash-based Message Authentication Code "HMAC" key(s)) from keystore 124.

Figure 2:
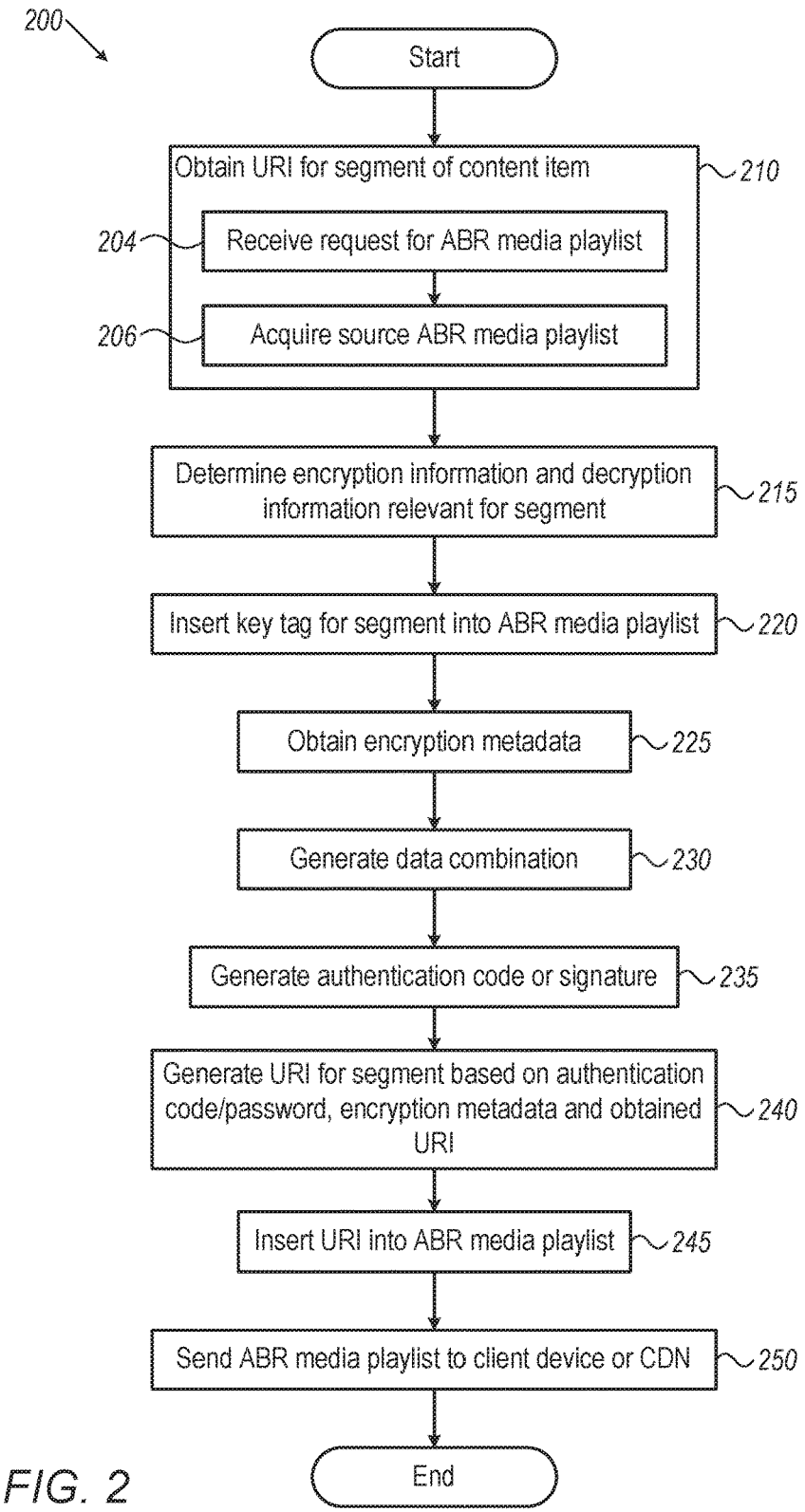
FIG. 2 is a flowchart of a method of generating a uniform resource identifier for a segment of a content item, in accordance with some embodiments of the presently disclosed subject matter.

FIG. 2 is a flowchart of a method 200 of generating a URI for a segment of a content item, in accordance with some embodiments of the presently disclosed subject matter. Method 200 is performed by ABR encryptor 130.

As mentioned above, depending on the embodiment, ABR encryptor 130 may or may not be integrated with packager/encoder 112. If not integrated, then an ABR media playlist stored in clear content storage 114 (also referred to herein as "source ABR media playlist") differs from the ABR media playlist (also referred to herein as "client ABR media playlist") that is sent to client device 150 or CDN 140 by ABR encryptor 130. If ABR encryptor 130 is integrated with packager/encoder 112, then the source ABR media playlist that is stored in clear content storage 114 may or may not be identical to the client ABR media playlist that is sent to client device 150 or CDN 140. It is assumed in some embodiments described herein that if ABR encryptor 130 is integrated with packager/encoder 112, the source ABR media playlist stored in clear content storage 114 is at least initially identical to the client ABR media playlist that is sent to client device 150 or CDN 140, although the source ABR media playlist may be updated in clear content storage 114 after the client ABR media playlist is sent to client device 150 or CDN 140. The description of method 200 covers both embodiments where ABR encryptor 130 is integrated with packager/encoder 112, and embodiments where ABR encryptor 130 is not integrated with packager/encoder 112.

In stage 210, ABR encryptor 130 obtains a URI for a segment of a content item. A URI for a segment is also referred to herein as a segment URI.

The obtained URI may, for instance, be a core URI or may, for instance, include a core URI, where the term core URI is used herein to refer to a URI that is only indicative of segment identification or to refer to the part(s) of a URI that is/are indicative of segment identification. A core URI may be indicative of segment identification e.g. by being indicative of a location of the segment and/or by being indicative of a name of the segment, etc.

In some embodiments, stage 210 includes stage 204 and stage 206, which will now be described.

In stage 204, ABR encryptor 130 receives a request for an ABR media playlist for the content item from client device 150 or CDN 140. In stage 206, ABR encryptor 130 acquires the source ABR media playlist from clear content storage 114. The source ABR media playlist lists one or more URIs for one or more segments, including a listed URI for the segment referred to in stage 210.

In these embodiments, the URI obtained in stage 210 for the segment may be the URI listed in the source ABR media playlist for the segment and thereby acquired by way of acquiring the source ABR media playlist in stage 206. Alternatively, the obtained URI may be derived from the URI listed in the source ABR media playlist. For instance, the obtained URI may be a relative URI (e.g. relative to a stream base URI that is useable for any relative URI's listed in the source ABR media playlist) that is derived from an absolute URI (e.g. beginning with http://) listed in the source ABR media playlist. In another instance, the obtained URI may be an absolute URI derived from a relative URI listed in the source ABR media playlist. In another instance, the obtained URI may include an absolute path to the segment in clear content storage 114, derived from an absolute or relative URI listed in the source ABR media playlist. In another instance, the obtained URI may be a relative URI or an absolute URI, derived from a URI that includes an absolute path to the segment in clear content storage 114, the latter URI being listed in the source ABR media playlist; etc. Herein below, an absolute URI is described as beginning with "http://" for simplicity of description. However, in some instances, an absolute URI may begin with "https://", when appropriate.

As mentioned above, in some cases, an ABR media playlist may be referenced in an ABR master playlist. In such cases, the source ABR media playlist may be acquired in stage 206 using a reference (e.g. URI) to the source ABR media playlist that is specified in an ABR master playlist.

In some other embodiments of stage 210, rather than executing stages 204 and 206, ABR encryptor 130 (e.g. when integrated with packager/encoder 112) obtains the URI for the segment by generating the URI during the packaging of the segment.

In one example that will be detailed herein, it is assumed that the channel base URI is /Chan1. The master playlist is at /Chan1/latest.m3u8. The stream base URI for the ABR media playlist (whether source and/or client) is /Chan1/stream1. The ABR media playlist is at /Chan1/stream1/stream.m3u8. The ABR media playlist specifies at least segment 72 and segment 73.

In this example, it is assumed that the obtained URI for segment 72 or 73 includes an absolute path, but is not an absolute URI, e.g. because the obtained URI includes the location of the segment in clear content storage 114 (e.g. /Chan1/stream1/seg72.ts or /Chan1/stream1/seg73.ts), but excludes the location of clear content storage 114 (e.g. beginning with "http://"). Optionally, such an obtained URI is derived from a relative URI listed in a source ABR media playlist (e.g. listed as seg72.ts or seg73.ts) that is acquired in stage 206. However, the obtained URI for segment 72 or 73 may instead be a relative URI that includes only the segment filename (e.g. seg72.ts or seg73.ts), or may be an absolute URI that includes the location of clear content storage 114, e.g. beginning with "http://". It is noted that in such examples, the difference between an obtained URI for segment 73 and an obtained URI for segment 72 is incremental (e.g. because the obtained URIs for the two consecutive segments are separated by a value of one).

In stage 215, ABR encryptor 130 determines the encryption information (e.g. encryption key and/or IV, etc.) and decryption information (e.g. decryption key and/or IV, etc.) relevant for the segment, or in other words the encryption information that is to be used for encrypting the segment and the decryption information that is to be used for decrypting the segment. The encryption information and decryption information for the segment match so that decryption of an encrypted segment results in the clear segment.

Encryption information and decryption information that are relevant for the segment may be dependent on one or more factors such as time, content, authorization level, definition level (also referred to as quality level), asset identifier (asset ID), location, etc. It is noted that particular encryption and decryption information may be relevant to one segment or to a plurality of segments. For instance, assuming that the encryption and decryption information are dependent on time, a certain encryption key and a certain decryption key may be used for anywhere between 2 to 7 hours of segments (or more or less). Optionally, the frequency of changing encryption/decryption keys is dependent on the number of suitable keys available in keystore 124.

Continuing with the description of the example of segment 72 or 73, it is assumed that the ABR media playlist (whether source and/or client) is a live ABR media playlist that specifies an absolute time for at least one of the segments specified in the ABR media playlist and specifies segment durations. For instance, assuming the ABR media playlist is a live HLS media playlist, a live HLS media playlist includes an EXT-X-PROGRAM-DATE-TIME tag relating to at least one of the specified segments (e.g. relating to the first specified segment), and also specifies segment durations for the segments. It is also assumed in this example that encryption and decryption information (e.g. keys and/or IVs, etc.) stored in keystore 124 are associated with time periods. For instance, which encryption/decryption information is used for a segment may depend on the absolute time/date that the segment was encoded/packaged by packager/encoder 112, this absolute time/date (e.g. as represented by a timestamp) being the factor for determining which encryption/decryption information is relevant for the segment. Under the assumption that the ABR media playlist is a live HLS media playlist, ABR encryptor 130 generates a segment timeline based on the EXT-X-PROGRAM-DATE-TIME tag and the segment durations. The segment timeline associates each segment in the ABR media playlist with the appropriate absolute time/date (e.g. as represented by a timestamp). Based on the generated timeline, ABR encryptor 130 determines which encryption information and decryption information are relevant for segment 72 or 73. It is noted that other types of ABR media playlists may have the same or similar information to a live HLS media playlist that enables association of a timestamp to segment 72 or 73 and determination of relevant encryption and decryption information.

In stage 220, ABR encryptor 130 inserts a key tag into an ABR media playlist that will be sent to client device 150 or CDN 140 for the content item, the key tag being indicative of the decryption information determined in stage 215 for the segment. The key tag, for instance, may include a key ID (e.g. an identifier that is a number). Continuing with the description of the example of segment 72, a key tag including a key ID 0007 is inserted into the ABR media playlist for segment 72.

In stage 225, ABR encryptor 130 obtains encryption metadata indicative of encryption information to be used for encrypting the segment when the segment is requested by client device 150 or CDN 140 (e.g. indicative of the encryption information determined in stage 215). Although such encryption metadata may be used by ABR encryptor 130 to obtain the encryption information (e.g. from keystore 124) for encrypting the segment when the segment is requested, the encryption metadata is not used to actually encrypt the segment. Depending on the embodiment, the encryption metadata may or may not be derived from the factor(s) that the encryption information depends on, as will be discussed in more detail below.

Depending on the embodiment, ABR encryptor 130 may obtain the encryption metadata by generating encryption metadata indicative of the encryption information and/or by using data that was not generated by ABR encryptor 130 but is indicative of encryption information for the encryption metadata. For instance, assuming encryption metadata that includes a timestamp, the timestamp may be generated by ABR encryptor 130 as part of the generation of the segment timeline described above with reference to stage 215.

Continuing with the description of the example of segment 72 or 73 but with reference to stage 225, the metadata for segment 72 or 73 includes the timestamp of the segment from the segment timeline generated in stage 215. Such a timestamp is indicative of the encryption information, provided that the encryption information is dependent on the factor of time as represented by the timestamp (see above discussion with reference to stage 215). Furthermore the metadata in this example is derived from time, being that the metadata includes the timestamp. The encryption metadata for segment 72 is assumed to include the timestamp "12:29:56", and the encryption metadata of segment 73 is assumed to include the timestamp "12:30:06".

In stage 230, ABR encryptor 130 generates a data combination based on the obtained URI and the encryption metadata.

Continuing with the description of the example of segments 72 or 73 but with reference to stage 230, the timestamp value is base32 coded and pre-pended to the segment filename, separated by a dash. For instance, if the base32 coded timestamp for segment 72 is KQ5DCMR2GI4TUNJW and the obtained URI includes an absolute path, then the data combination for segment 72 is /Chan1/stream1/KQ5DCMR2GI4TUNJW-seg72.ts, where seg72.ts is the segment filename as discussed above. If the base32 coded timestamp for segment 73 is KQ5DCMR2GMYDUMBW and the obtained URI includes an absolute path, then the data combination for segment 73 is /Chan1/stream1/KQ5DCMR2GMYDUMBW-seg73.ts. It should be evident that base32 coding need not be applied, and that the data combinations may be generated in a different manner than described in this example.

In stage 235, ABR encryptor generates an authentication code or a signature by applying a secret to the data combination. The secret is unknown to client device 150 and to CDN 140. The secret, however, is shared among the plurality of ABR encryptor servers, if ABR encryptor 130 comprises a plurality of servers. The secret may be any suitable secret that may be applied to the data combination to generate the authentication code or signature. Examples of a secret may include the private key for a signature scheme such as Digital Signature Algorithm, RSA, Lamport, Merkle, Rabin, GMR, etc. For instance, a private key may have been obtained upon startup of ABR encryptor 130 or may be obtained in stage 235 from keystore 124. Examples of an authentication code may include an HMAC, One-key Message Authentication Code (OMAC), Cipher Block Chaining Message Authentication Code (CBC-MAC), Parallelizable Message Authentication Code (PMAC), UMAC, VMAC, etc. For instance, if the authentication code is an HMAC (e.g. HMAC-SHA1, HMAC-MD5, etc.) the secret may include an HMAC key. In such an instance, the HMAC key may have been obtained upon startup of ABR encryptor 130 or may be obtained in stage 235 from keystore 124, e.g. by requesting a video on demand (VOD) key with asset ID "ABR Encryption HMAC Authentication Secret", or similar.

Continuing with the description of the example of segment 72 or 73 but with reference to stage 235, the authentication code that is generated for segment 72 or 73 is assumed to be an HMAC-SHA1. The secret includes an HMAC key (either the same or a different HMAC key for each of segments 72 and 73). Applying the secret to the data combination for segment 72, for instance, results in an HMAC-SHA1 value of 0x83ec7ba9ad6d9d2c6e68b83d5c253b5facc5d3e5.

In stage 240, ABR encryptor 130 generates a URI for the segment based on the authentication code or the signature (generated in stage 235), the encryption metadata (obtained in stage 225) and the obtained URI (obtained in stage 210).

In stage 245, ABR encryptor 130 inserts the generated URI into the ABR media playlist that will be sent to client device 150 or CDN 140 (namely into the ABR media playlist for the content item that the key tag for the segment was inserted into in stage 220). The URI will therefore be provided to client device 150 or CDN 140, as part of the ABR media playlist, when the ABR media playlist is sent to client device 150 or CDN 140 (see next stage 250). It is noted that the provided URI excludes the relevant encryption information that is required to perform the encryption. The exclusion of the encryption information prevents the encryption information from becoming publicly accessible. It is also noted that the secret is unknown to client device 150 and CDN 140 and therefore client device 150 and CDN 140 are barred from performing a modification to the URI that would be undetectable by ABR encryptor 130. It is further noted that because generation of the signature or authentication code for the segment was based on the URI obtained for the segment (due to the data combination being based on the obtained URI), neither client device 150 nor CDN 140 may successfully substitute another URI which relates to another segment that was provided to client device 150 or CDN 140 by ABR encryptor 130.

Continuing with the description of the example of segment 72 or 73 but with reference to stage 240, the HMAC-SHA1 value for segment 72 is base32 coded, resulting in QPWHXKNNNWOSY3TIXA6VYJJ3L6WMLU7F. The base32 coded representation of the HMAC-SHA1 value is pre-pended to the base32 coded timestamp, separated by a dash. The generated URI for segment 72 is therefore assumed to be /Chan1/stream1/QPWHXKNNNWOSY3TIXA6VYJJ3L6WMLU7F-KQ5DCMR2GI4TUNJW-seg72.ts, if the generated URI includes an absolute path, http://serverx/Chan1/stream1/QPWHXKNNNWOSY3TIXA6VYJJ3L6WMLU7F-KQ5DCMR2GI4TUNJW-seg72.ts, if the generated URI includes an absolute URI (assuming clear content storage 114 is located at http://serverx), or QPWHXKNNNWOSY3TIXA6VYJJ3L6WMLU7F-KQ5DCMR2GI4TUNJW-seg72.ts), if the generated URI includes a relative URI that is relative to the base stream URI. Similarly, the same processing is applied for segment 73 and the generated URI is therefore assumed to be /Chan1/stream1/4UCPQYSRWHRWZC6WVUHW6XAEF6BNEX5D-KQ5DCMR2GMYDUMBW-seg73.ts, http://serverx/Chan1/stream1/4UCPQYSRWHRWZC6WVUHW6XAEF6BNEX5D-KQ5DCMR2GMYDUMBW-seg73.ts or 4UCPQYSRWHRWZC6WVUHW6XAEF6BNEX5D-KQ5DCMR2GMYDUMBW-seg73.ts. It is noted that in such examples, the difference between a generated URI for segment 73 and a generated URI for segment 72 is not incremental. It should be evident that base32 coding need not be applied, and that the URIs may be generated in a different manner than described in this example.

Depending on the embodiment, the data combination may have been generated in stage 230 based on the obtained URI and the encryption metadata, in any appropriate manner. Depending on the embodiment, the URI may have been generated in stage 240 based on the authentication code or the signature, the encryption metadata and the obtained URI, in any appropriate manner. For the sake of further illustration, certain examples of such generation are now elaborated on. A URI or data combination that is generated based on the obtained URI may include the obtained URI, or may include a processed version of the obtained URI. For example, processing may include transforming a relative URI (or absolute URI, or URI including an absolute path) to an absolute URI (or to a relative URI, or to a URI including an absolute path) and/or may include any other suitable processing. A URI or data combination that is generated based on encryption metadata, may include the encryption metadata, or may include a processed version of the encryption metadata. A URI that is generated based on an authentication code or signature, may include the authentication code or signature or may include a processed version of the authentication code or signature. Processing of encryption metadata and/or processing of an authentication code or signature may include, for example, coding such as base32 coding and/or any other suitable processing. The URI generated in stage 240 may, for example, be a relative URI, absolute URI, or URI including an absolute path, regardless of whether the obtained URI was relative, absolute, or included an absolute path.

In stage 250, ABR encryptor 130 sends the ABR media playlist (which includes the URI inserted in stage 245) to client device 150 or CDN 140. ABR encryptor 130 thereby enables the generated URI or a processed version thereof to be used by client device 150 or CDN 140 in requesting the segment (e.g. see stage 315 FIG. 3 below).

For instance, stage 250 may be performed once URIs have been generated for all of the segments that are specified by the ABR media playlist that is to be sent to client device 150 or CDN 140 (e.g. for all segments specified by a source ABR media playlist acquired in stage 206 by ABR encryptor 130, or for all segments packaged by an integrated packager/encoder/encryptor for the ABR media playlist). In such an instance, stages 210-245 are repeated for all of such segments prior to execution of stage 250. If the sending of the ABR media playlist to CDN 140 or client device 150 follows a request for the playlist from CDN 140 or client device 150, the ABR media playlist is sent to the requestor of the ABR media playlist.

In some embodiments where ABR encryptor 130 is integrated with packager/encoder 112, the ABR media playlist that is sent to client device 150 or CDN 140 may be identical, at least initially, to an ABR media playlist that is stored in clear content storage 114. For instance, an ABR media playlist may be prepared (e.g. by repeating stages 210-245 for the various segments during packaging) and stored in clear content storage 114. In an additional stage executed between stages 245 and 250 in these embodiments, ABR encryptor 130 may retrieve the stored ABR media playlist when the playlist is requested by client device 150 or CDN 140. Such an ABR media playlist has segment encryption metadata pinned to the generated segment URIs (or in other words has URIs that are indicative of encryption metadata), because the generated URIs are based on the encryption metadata (see stage 240). The retrieved ABR media playlist may be sent, as is, to the client device 150 or CDN 140, or optionally changed before sending in stage 250. Therefore in these embodiments, client device 150 or CDN 140 receives an ABR media playlist that is possibly the same as the ABR media playlist stored in clear content storage 114 upon packaging.

In some other embodiments, client device 150 or CDN 140 receives an ABR media playlist that is different from an ABR media playlist acquired by ABR encryptor 130 from clear content storage 114 in stage 206. The difference includes that the ABR media playlist received by client device 150 or CDN 140 includes URIs having segment encryption metadata pinned thereto. In these embodiments, CDN 140 or client device 150 does not have access to the unmodified URIs (e.g. core URIs) listed in the acquired ABR media playlist, e.g. because CDN 140 or client device 150 does not have access to clear content storage 114 which stores the ABR media playlist that lists the unmodified URIs.

Optionally, ABR encryptor 130 (or if ABR encryptor 130 includes a plurality of servers, then the particular server of ABR encryptor 130) which performs method 200 saves a copy of the ABR media playlist that is sent to client device 150 or CDN 140. If a copy was saved, then when an ABR media playlist specifying the segment is again required to be sent by ABR encryptor 130 (or by the particular server of ABR encryptor 130), ABR encryptor 130 (or the particular server) may retrieve the saved copy in order to send the ABR media playlist rather than performing method 200, or may perform method 200 again in order to send the ABR playlist. If the ABR media playlist is sent in stage 250 to CDN 140, then CDN 140 optionally saves a copy of the ABR media playlist.

Figure 3:
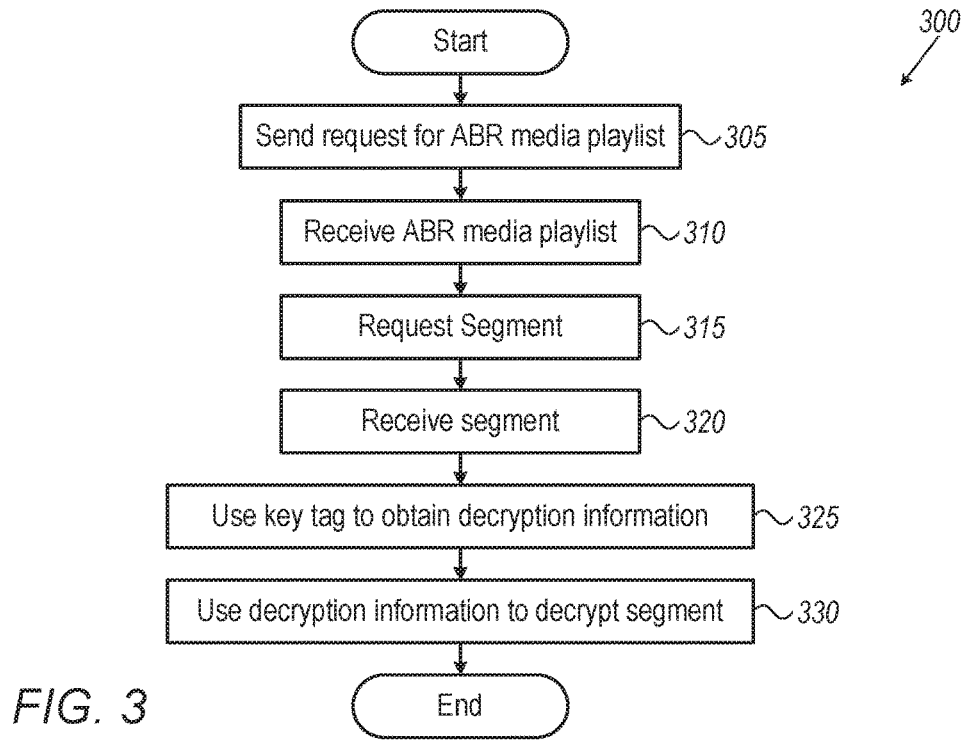
FIG. 3 is a flowchart of a method performed by a client device, in accordance with some embodiments of the presently disclosed subject matter.

FIG. 3 is a flowchart of a method 300 performed by a client device 150, in accordance with some embodiments of the presently disclosed subject matter. Method 300 enables client device 150 to manage at least some of the encryption metadata.

In stage 305, client device 150 sends a request for an ABR media playlist for a content item to CDN 140, or directly to ABR encryptor 130.

For instance, client device 150 may issue an HTTP GET request to retrieve the ABR media playlist, the request including a URI for the ABR media playlist. In some cases where the ABR media playlist may have been referenced in an ABR master playlist for the content item that was received by client device 150, the request for the ABR media playlist may include the reference (e.g. URI) to the ABR media playlist that was included in the master ABR master playlist.

If the request was sent to CDN 140, and the ABR media playlist is stored on CDN 140, then depending on the implementation, CDN 140 may send the ABR media playlist to client device 150; or CDN 140 may request the ABR media playlist from ABR encryptor 130, receive the ABR media playlist from ABR encryptor and send the ABR media playlist to client device 150. Alternatively, if the request was sent to CDN 140 and the ABR media playlist is not stored on content delivery network, then CDN 140 subsequently requests the ABR media playlist from ABR encryptor, receives the ABR media playlist from ABR encryptor and sends the ABR media playlist to client device 150. If the request was sent directly to ABR encryptor 130 then ABR encryptor 130 sends the ABR media playlist to client device 150. For example, the ABR playlist that is sent may be the ABR media playlist referred to in stage 250 of FIG. 2 discussed above.

In stage 310, in response to the request of stage 305, client device 150 receives the ABR media playlist. The ABR media playlist at least specifies a particular segment of a content item (the particular segment being the segment discussed in method 300), including listing a URI for the segment, such as a URI that is indicative of encryption metadata, generated in accordance with method 200 (FIG. 2), and a key tag for the segment. Therefore although stage 315 (described below) for the particular segment may follow stage 310, there is optionally a time lag between stage 310 and 315, during which other segments specified in the ABR media playlist (if any), and/or segment(s) specified in other ABR media playlist(s) relating to the content item (if other ABR media playlist(s) relating to the content item were received by client device 150) may be requested by client device 150.

Referring to segment 72 as an example of the particular segment, the listed URI may be /Chan1/stream1/ QPWHXKNNNWOSY3TIXA6VYJJ3L6WMLU7F-KQ5DCMR2GI4TUNJW-seg72.ts., http://serverx/Chan1/stream1/QPWHXKNNNWOSY3 TIXA6VYJJ3L6 WMLU7F-KQ5DCMR2GI4TUNJW-seg72.ts or QPWHXKNNNWOSY3TIXA6VYJJ3L6WMLU7F-KQ5DCMR2GI4TUNJW-seg72.ts In stage 315, client device 150 requests the particular segment, including sending a URI for the particular segment to CDN 140 or to ABR encryptor 130. The URI that is sent is indicative of encryption metadata, an authentication code or signature and segment identification. For example, the sent URI may be the URI listed in the ABR playlist, or may be a processed version of the listed URI, generated by transforming the listed URI and/or applying any other suitable processing. Client device 150 may, for instance, transform a relative URI listed in the ABR media playlist to an absolute URI, and the absolute URI may be sent. Additionally or alternatively client device 150 may process the URI by extending the URI to include additional information, or by shortening the URI to remove information (e.g. remove information that is unrelated to any of: encryption metadata, authentication code or signature, or segment identification from the URI listed in the ABR playlist). The URI that is sent may be included, for instance, in an HTTP GET request for the segment.

If the URI was sent by client device 150 to CDN 140, and the segment, encrypted, is stored on CDN 140, then depending on the implementation, CDN 140 may send the segment, encrypted, to client device 150; or CDN 140 may request the segment from ABR encryptor 130 (e.g. by sending the URI received from client device 150 or a processed version thereof to ABR encryptor 130), receive the segment, encrypted, from ABR encryptor and send the segment, encrypted, to client device 150. Alternatively, if the URI was sent by client device 150 to CDN 140 and the segment is not stored on CDN 140, then CDN 140 subsequently requests the segment from ABR encryptor (e.g. by sending the URI received from client device 150 or a processed version thereof to ABR encryptor 130), receives the segment, encrypted, from ABR encryptor and sends the segment, encrypted to client device 150. If the URI was sent by client device 150 directly to ABR encryptor 130 then ABR encryptor 130 sends the segment, encrypted, to client device 150.

It is noted that if ABR encryptor 130 includes a plurality of servers, the URI for the particular segment is not necessarily sent to the same server that provided the ABR media playlist which specifies the segment. Additionally or alternatively, if there is a plurality of segments specified by the ABR media playlist, not necessarily all URIs for all specified segments are sent to the same server of ABR encryptor 130.

In stage 320, client device 150 receives the particular segment, encrypted, from CDN 140 or directly from ABR encryptor 130.

In stage 325, client device 150 uses the key tag listed in the ABR media playlist for the particular segment to obtain decryption information for the segment. For example, client device 150 may send a key ID included in the key tag to license generator 126. The key ID is used by license generator 126 to identify an associated license, and to fetch decryption information (e.g. the decryption key and/or initialization vector ("IV"), etc.) for the segment from keystore 124. Client device 150 receives the decryption information for the particular segment from license generator 126.

In stage 330, client device 150 uses the decryption information obtained in stage 325 to decrypt the particular segment that was received in stage 320, thereby rendering the segment clear so that the segment may be played by client device 150.

It is noted that in some embodiments of the subject matter, method 300 is identical to a method that would have been executed by a parallel client device (optionally via a parallel CDN) with respect to URIs that are not indicative of encryption metadata (e.g. URIs that are core URIs). In these embodiments, such a parallel client device and/or CDN may not need to be specially adapted in order to implement the subject matter as client device 150 and/or CDN 140.

Figure 4:
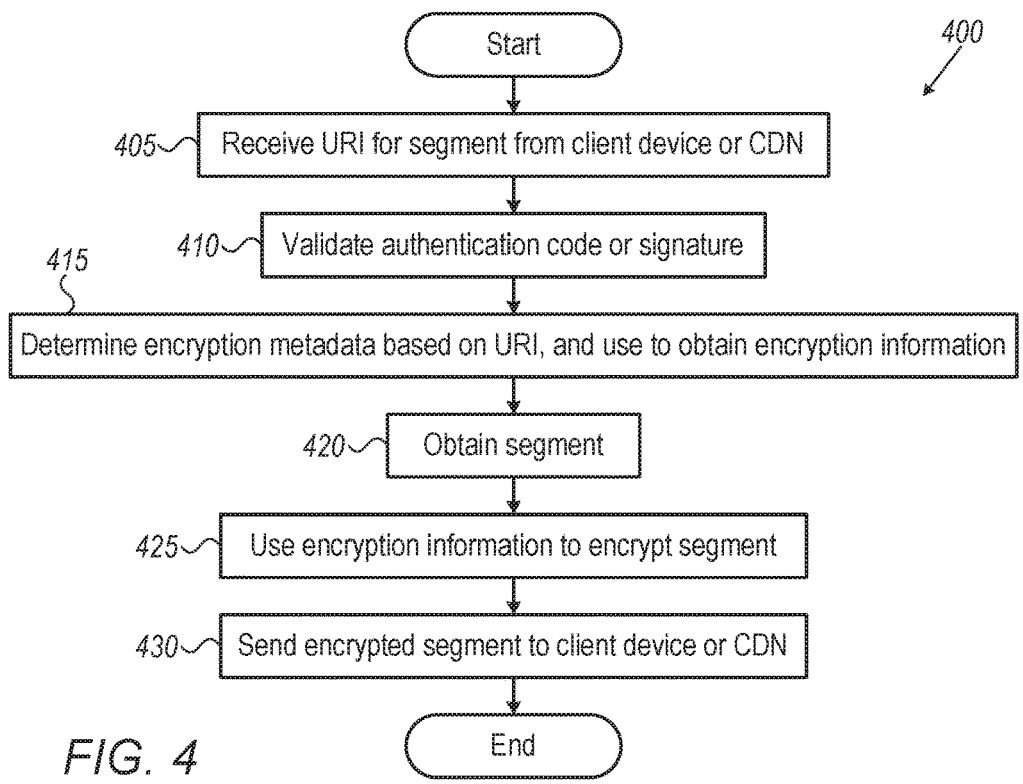
FIG. 4 is a flowchart of a method of encrypting a segment of a content item, in accordance with some embodiments of the presently disclosed subject matter.

FIG. 4 is a flowchart of a method 400 of encrypting a segment of a content item, in accordance with some embodiments of the presently disclosed subject matter. Method 400 is performed by ABR encryptor 130.

In stage 405, ABR encryptor 130 receives a request for a segment of a content item, including receiving a URI of a segment of the content item from CDN 140 or from client device 150. The segment request (e.g. HTTP GET request) is in some embodiments independent of requests, if any, for other segments of the content item (e.g. even if the segments are specified in the same ABR media playlist), and therefore may be handled by any server included in ABR encryptor 130. It is noted that if ABR encryptor 130 includes a plurality of servers, then for the same segment, method 400 (including encryption stage 425) may be performed by the same server or by a different server than the server that performed method 200.

The URI received in stage 405 is indicative of encryption metadata, an authentication code or signature, and segment identification.

In some embodiments, ABR encryptor 130 receives a URI that was included in an ABR media playlist that was sent to client device 150 or CDN 140. For example, a segment request for segment 72, may include the URI /Chan1/stream1/ QPWHXKNNNWOSY3TIXA6VYJJ3L6WMLU7F-KQ5DCMR2GI4TUNJW-seg72.ts, http://serverx/Chan1/stream1/ QPWHXKNNNWOSY3TIXA6VYJJ3L6WMLU7F-KQ5DCMR2GI4TUNJW-seg72.ts or QPWHXKNNNWOSY3TIXA6VYJJ3L6WMLU7F-KQ5DCMR2GI4TUNJW-seg72.ts as discussed above with reference to stage 240 (FIG. 2). Such a URI is indicative of encryption metadata, an HMAC, and segment identification, as the URI was generated based on the encryption metadata, an HMAC and an obtained URI (that includes a core URI), as discussed above with reference to method 200. However, in other embodiments the URI received in stage 405 is not identical to a URI generated by ABR encryptor 130 and inserted in an ABR media playlist for the segment, for instance in accordance with method 200 (FIG. 2), but is still indicative of encryption metadata, an authentication code or signature, and segment identification. For instance, client device 150 or CDN 140 may be permitted to send a processed version of the URI included in the ABR media playlist as long as the URI that is sent is indicative of encryption metadata, an authentication code or signature, and identification of the segment in a manner which allows ABR encryptor 130 to perform the remainder of method 400. With respect to a processed version, any suitable processing may have been performed, e.g., the URI that was included in the ABR media playlist may have been transformed (e.g. from relative to absolute) and/or extended to include additional information, or shortened to remove information, by client device 150 and/or CDN 140, and this transformed and/or extended/shortened URI may have been sent to and received by ABR encryptor 130.

In stage 410, ABR encryptor 130 determines the authentication code or the signature based on the URI. ABR encryptor 130 validates the authentication code or the signature.

By validating the authentication code or the signature, ABR encryptor 130 validates the URI as having been generated by ABR encryptor 130 (either by the same ABR encryptor server or a different ABR encryptor server, if any, than the ABR encryptor server which received the URI). The validation may include applying a key (e.g. HMAC key, public key, etc.) to validate the authentication code or signature. For instance, if the authentication code is an HMAC such as HMAC-SHA1, HMAC-MD5, etc., the HMAC key may have been obtained upon startup of ABR encryptor 130 or may be obtained in stage 410 from keystore 124, e.g. for an HMAC key by requesting a VOD key with asset ID "ABR Encryption HMAC Authentication Secret", or similar. Similarly, if a public key is used, the public key may have been obtained upon startup of ABR encryptor 130 or may be obtained in stage 410 from keystore 124.

In some embodiments of stage 410, ABR encryptor 130 determines the authentication code or signature by extracting corresponding part(s) of the URI from position(s) in the URI designated for the part(s). The extracted part(s) may include the signature or authentication code. Additionally or alternatively if the signature/authentication code had been coded (e.g. base32 coding) and/or had undergone any other processing, the coding and/or processing of the extracted part(s) may be reversed in order to attain the signature/authentication code.

Referring to the example of segment 72, the part that is extracted is QPWHXKNNNWOSY3TIXA6VYJJ3L6WMLU7 from the designated position for the HMAC within the URI, e.g. pre-pended to the base32 coded timestamp, separated by a dash. The base32 coding of this extracted part is reversed, resulting in the HMAC-SHA1 value of 0x83ec7ba9ad6d9d2c6e68b83d5c253b5facc5d3e5. In this example, the HMAC key is used to validate the HMAC value against the remainder of the URI (i.e. the remainder after extraction of the part(s) from the designated positions(s) for the HMAC within the URI). In other words, the HMAC key is used to validate 0x83ec7ba9ad6d9d2c6e68b83d5c253b5facc5d3e5 against the remainder of the received URL, assumed for the sake of example to be /Chan1/stream1/KQ5DCMR2GI4TUNJW-seg72.ts. In this example, the remainder is the data combination referred to in stage 230 of FIG. 2. It is noted that in other examples, the validation may not necessarily be against the remainder of the URI, but may be against certain part(s) of the URI, a processed version of the URI or certain part(s) thereof, etc., depending on the relationship between the URI received in stage 405 and the data that the secret was applied to in order to generate the signature or authentication code (e.g. in stage 235 FIG. 2). Additionally or alternatively in other examples, any appropriate procedure to validate the authentication code or signature may be performed, depending on how the signature or the authentication code was generated.

If validation succeeds in stage 410, then method 400 continues to stage 415. If validation fails in stage 410, then the request for the segment is rejected and the segment is not sent to the requestor. Method 400 may in this case end for the segment after stage 410, or one or more of the following stages may be performed as long as the final stage of sending the segment (stage 430) is not performed.

In stage 415, ABR encryptor 130 determines the encryption metadata based on the URI, and uses the encryption metadata to obtain encryption information (e.g. encryption key and/or IV, etc.)

For instance, the encryption metadata may be used to look up the encryption information in keystore 124. Additionally or alternatively, if ABR encryptor 130 obtained any of the encryption information (e.g. encryption key) at startup, that encryption information may be looked up internally in ABR encryptor 130.

In some embodiments of stage 415, ABR encryptor 130 may determine the encryption metadata by extracting corresponding part(s) of the URI from position(s) in the URI designated for the part(s). The extracted part(s) may include the encryption metadata. Additionally or alternatively if the encryption metadata had been coded (e.g. base32 coding) and/or had undergone any other processing, the coding and/or other processing of the extracted part(s) may be reversed in order to attain the encryption metadata.

Referring to the example of segment 72, the part that is extracted is KQ5DCMR2GI4TUNJW, from the designated position for an authentication code or signature within the URI, e.g. the position of pre-pended to the segment filename, separated by a dash. The base32 coding of this part is reversed, resulting in the encryption metadata of 12:29:56, which is a timestamp for segment 72. ABR encryptor 130 uses the timestamp of 12:29:56 to obtain the encryption information, e.g. by looking up the encryption information for the given time stamp in keystore 124 and/or internally in ABR encryptor 130. If encryptor 130 includes a plurality of servers, the clocks for the various proxy servers are optionally synchronized so that the timestamp is detected as representing the same point in time, regardless of which proxy server is performing stage 415.

In stage 420, ABR encryptor 130 determines the segment identification based on the URI, and uses the segment identification to obtain the segment, for instance from clear content storage 114.

In some embodiments of stage 420, ABR encryptor 130 determines the segment identification by extracting corresponding part(s) of the URI (e.g. the core URI) from position(s) in the URI designated for the part(s). The extracted part(s) may include the segment identification. Additionally or alternatively if the segment identification had been transformed and/or had undergone any other processing, the transformation and/or other processing of the extracted part(s) may be reversed in order to attain the segment identification. Optionally the segment identification is identical to the URI obtained in stage 210 of FIG. 2

Referring to the example of segment 72, the segment identification for segment 72 may include /Chan1/stream1/seg72.ts, http://serverx/Chan1/stream1/seg72.ts or seg72.ts.

In stage 425, ABR encryptor 130 uses the encryption information (obtained in stage 415) to encrypt the segment (obtained in stage 420).

In stage 430, ABR encryptor sends the segment, encrypted, to CDN 140 or client device 150 which sent the URI to ABR encryptor 130 in stage 405.

Method 400 then ends.

Stages shown in any of FIG. 2, 3 or 4 as being performed in a certain order are in some embodiments performed in a different order. Additionally or alternatively, stages which are shown in any of FIG. 2, 3 or 4 as being performed consecutively are in some embodiments performed simultaneously. Additionally or alternatively, in some embodiments any of methods 200, 300 or 300 includes fewer, more and/or different stages than illustrated in FIG. 2, 3 or 4, respectively.

In some embodiments, the secret (e.g. HMAC key) used in method 200 (FIG. 2) and/or in method 400 rotates automatically and regularly, in order to limit the damage of lost or stolen secrets (e.g. lost or stolen HMAC keys). In these embodiments, requests for segments using the old secret may be seen as valid for a period of time after the change to a new secret, or ABR encryptor 130 may start with a new secret and break any in-progress playback at client device 150, e.g. at a time when live streaming is less likely such as 3 AM.

It is noted that if a segment, encrypted (in method 400), and/or an ABR media playlist (in method 200) is sent to CDN 140, CDN 140 optionally stores the segment, encrypted, associated with the URI used to request the segment and/or the ABR media playlist associated with the URI used to request the ABR media playlist. Assuming a segment, encrypted, and/or ABR media playlist is stored, if the same or a different client device 150 later provides the URI associated with the stored segment or the ABR media playlist to CDN 140, CDN 140 may deliver the segment, encrypted, or ABR media playlist from the storage in response, or may send the URI to ABR encryptor 130, depending on the implementation. The stored segment, encrypted, and/or stored ABR media playlist may therefore be delivered more than once by CDN 140. Provided a URI is not customized per client device 150, the stored segment, encrypted, and/or stored ABR media playlist may be delivered by CDN 140 to more than one client device 150. In some embodiments, storage at CDN 140 of segment(s), encrypted, and/or of ABR media playlist(s) limits the bandwidth and connection requests to ABR encryptor 130, compared to embodiments where system 100 does not implement such storage. Typically segment(s), encrypted, and/or ABR media playlist(s), if stored at CDN 140, are stored only for a very short time period so as to limit the amount of memory needed for such storage. In some embodiments of system 100, CDN 140 is omitted from system 100 or does not store segments, encrypted, nor ABR media playlists.

Assuming ABR encryptor 130 includes a plurality of servers, in order to allow scalability where any one of the servers may generate a URI for a segment (e.g. in accordance with method 200), and any one of the servers (and not necessarily the same server) may process the URI when received by client device 150 or CDN 140 (e.g. in accordance with method 400), in some embodiments the various servers of ABR encryptor 130 are able to access the same content in clear content storage 114 (even if there is a plurality of clear content storages 114, and the various servers access different clear content storages 114) and obtain the same encryption information, e.g. from keystore 124 (even if there is a plurality of keystores 124, and the various servers obtain encryption information from different keystores 124). In such embodiments, the encryption metadata for a segment is the same regardless of which server pinned the encryption metadata to the segment URI in the ABR media playlist, and the encryption information that is used agrees with the pinned encryption metadata.

In the examples of segment 72 or 73 described above with reference to methods 200 and 400, the encryption/decryption applied to a segment varies with time. For instance, encryption/decryption keys may change on time boundaries, allowing encryption/decryption key rotation on time boundaries. In these examples, the encryption/decryption information is dependent on the factor of time.

However, the subject matter is not limited to time considerations and the encryption/decryption information that is relevant for a segment may additionally or alternatively be dependent on other factor(s).

For example, in video on demand (VOD) processing, the relevant encryption/decryption information may be dependent on content ID's (also referred to as asset identifiers).

As another example, the relevant encryption/decryption information may be dependent on the content of the content item associated with the segment. For instance, the encryption/decryption information may differ per program, or may be different for programs versus advertisements. Possibly, the relevant encryption/decryption information changes at the start of a new program.

As another example, the relevant encryption/decryption information may be dependent on an authorization level for the content item. For instance, encryption information may differ for a premium soccer match where viewing is more restricted compared to a news show where viewing is less restricted. In such an instance, encryption information for a segment varies depending on the authorization level of the content item associated with the segment.

As another example, the relevant encryption/decryption information may be dependent on the definition level (e.g. high definition versus low definition, also considered as high quality versus low quality) of the content item associated with the segment. For instance, encryption information for a segment may differ for high definition versus for low definition of the content item associated with the segment.

As another example, the relevant encryption/decryption information may be dependent on the location. For instance, encryption/decryption information may vary depending on the location of a particular client device 150 relative to the location of an event such as a football match. In such an instance, a particular client device 150 that is located close to the football match (e.g. within 20 miles of the location of the football match) may not be allowed to decrypt a content item comprising live broadcast of the football match.

As another example, the relevant encryption/decryption information may be dependent on any other factor(s). As another example, the relevant encryption/decryption information may be dependent on any combination of factors such as time, content, authorization level, definition level, asset identifier, location, and/or any other factor(s). For instance, in some cases, a particular client device 150 is not allowed to decrypt a live broadcast of a football match, due to the location of the particular content device 150 vis à vis the location of the event, but may be allowed to decrypt entertainment programs received on the same channel before and after the broadcast of the football match. In these cases, such a client device 150 experiences a blackout period during the live broadcast of the match, not being permitted to decrypt the content item, and therefore the relevant encryption/decryption information is dependent both on location and on time. Referring again to the example of segment 72 or 73, such a client device 150 may not be permitted to decrypt the segment, if the segment is associated with the live broadcast of the football match.

In some embodiments, encryption metadata is related to one or more of the factor(s) on which the encryption/decryption information depends, e.g. by being derived from the factor(s). For example, encryption metadata for a segment may be derived from time as discussed above. As another example, encryption metadata for a segment may be derived from the asset identifier, e.g. the encryption metadata may include the asset identifier. As another example, encryption metadata for a segment may be derived from a program identifier of a program associated with the segment, e.g. the encryption metadata may include the program identifier.

In some other embodiments, encryption metadata is unrelated to any of the factor(s) on which the encryption/decryption information depends. For instance, encryption metadata may include an assigned number or alphanumeric character string which identifies the encryption information, but is unrelated to the factor(s) on which the encryption/decryption information depends. For example, assuming encryption/decryption that is dependent on definition level, the encryption metadata for a segment may include an assigned number that is the key ID (as per the key tag), or another assigned number. Referring to the example of segment 72, and assuming encryption/decryption information that is dependent on time, instead of the encryption metadata for segment 72 including a timestamp, the encryption metadata for segment 72 may include an assigned number, such as 0007 (similar to the key ID for segment 72), or such as 0008 (or any other number that is different than the key ID for segment 72).

ABR encryptor 130 comprises, in some embodiments, dedicated hardware logic circuits, in the form of an application-specific integrated circuit (ASIC), field programmable gate array (FPGA), or full-custom integrated circuit, or a combination of such devices. Alternatively or additionally, some or all of the functions of ABR encryptor 130 may be carried out by at least one programmable processor, such as a microprocessor or digital signal processor (DSP), under the control of suitable software in one or more computer readable medium/media. For example, a computer readable medium may be any suitable medium for transferring software, e.g. if software is downloaded to the processor(s) in electronic form, over a network. Alternatively or additionally, a computer readable medium may be any suitable storage medium for storing software. The term memory in the single form is used herein to refer to one or more storage media.

Figure 5:
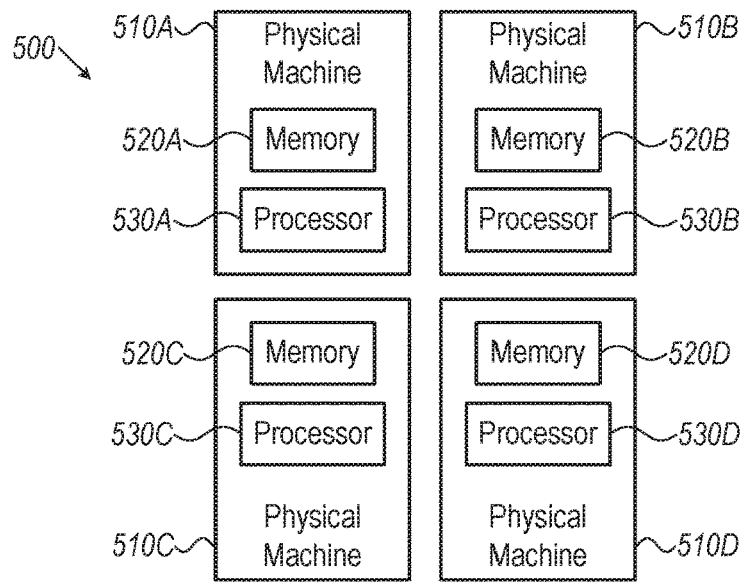
FIG. 5 is a block diagram of an ABR encryptor for use in the system of FIG. 1, in accordance with some embodiments of the presently disclosed subject matter.

Reference is now made to FIG. 5 which is a block diagram of an ABR encryptor 500 for use in system 100 of FIG. 1, in accordance with some embodiments of the presently disclosed subject matter.

ABR encryptor 500 is an example of ABR encryptor 130. ABR encryptor 500 includes a plurality of servers. Each server is located on a separate physical machine 510. Each physical machine 510 includes memory 520 and one or more respective programmable processors 530 implementing the respective server. For example, four physical machines 510, namely physical machine 510A, physical machine 510B, physical machine 510C, and physical machine 510D are shown in FIG. 5, each with respective memory 520, namely memory 520A, 520B, 520C and 520D and a respective programmable processor 530, namely processor 530A, 530B, 530C and 530D.

Figure 6:
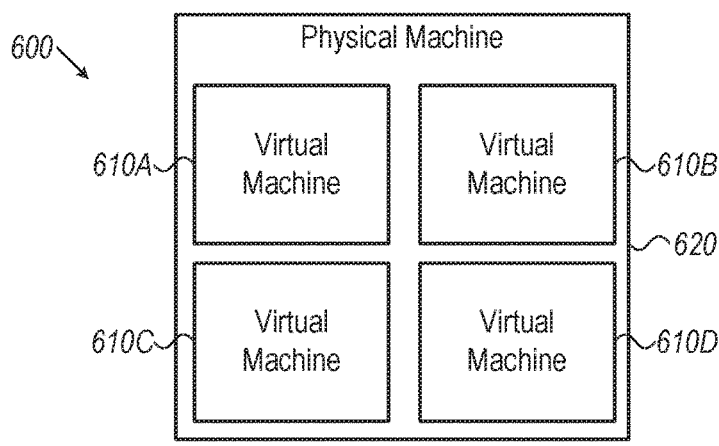
FIG. 6 is a block diagram of another ABR encryptor for use in the system of FIG. 1, in accordance with some embodiments of the presently disclosed subject matter.

FIG. 6 is a block diagram of another ABR encryptor 600 for use in system 100 of FIG. 1, in accordance with some embodiments of the presently disclosed subject matter.

ABR encryptor 600 is an example of ABR encryptor 130. ABR encryptor 600 includes a plurality of servers. Each server is implemented in a respective virtual machine 610 located in a physical machine 620. For example, four virtual machines 610, namely virtual machine 610A, virtual machine 610B, virtual machine 610C, and virtual machine 610D are shown in physical machine 620 in FIG. 6. Virtual machines 610 share hardware such as programmable processor(s) and memory of physical machine 620. Additionally or alternatively, each server may be implemented in a respective container located in physical machine 620, with the containers sharing hardware such as programmable processor(s) and memory of physical machine 620, Therefore, the programmable processor(s) in physical machine 620 implement(s) the plurality of servers.

Memory 520 and/or the memory in physical machine 620 may store instructions, which at least one of processor(s) 530 and/or the processor(s) in physical machine 620 executes, in order to perform method 200 and/or 400 described above. For example, the processor(s) that implement(s) a particular server of ABR encryptor 500 or 600 may execute instruction(s) in order to perform one or more stage(s) of method 200 and/or 400 performed by the server. Physical machines 510 and/or 620 may additionally or alternatively comprise other hardware, firmware and/or software components as are known in the art.

ABR encryptor 130 may instead include only one proxy server. ABR encryptor 130 may instead include a plurality of servers, some of which are located in separate physical machines, and some of which are located in the same physical machine but implemented in various virtual machines and/or containers.

In some embodiments, client device 150 comprises dedicated hardware logic circuits, in the form of an application-specific integrated circuit (ASIC), field programmable gate array (FPGA), or full-custom integrated circuit, or a combination of such devices. Alternatively or additionally, some or all of the functions of client device 150 may be carried out by at least one programmable processor, such as a microprocessor or digital signal processor (DSP), under the control of suitable software in one or more computer readable medium/media. For example, a computer readable medium may be any suitable medium for transferring software, e.g. if software is downloaded to the processor(s) in electronic form, over a network. Alternatively or additionally, a computer readable medium may be any suitable storage medium for storing software.

Figure 7:
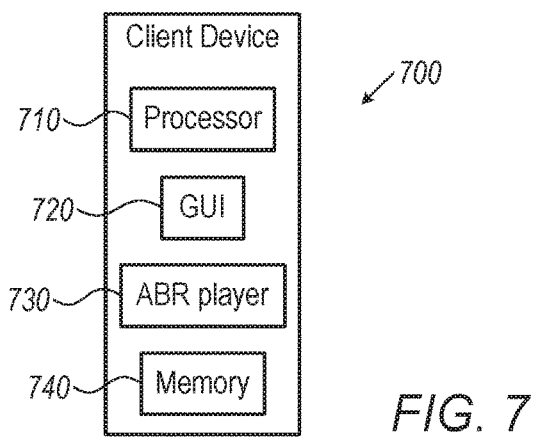
FIG. 7 is a block diagram of a client device for use in the system of FIG. 1, in accordance with some embodiments of the presently disclosed subject matter.

Reference is now made to FIG. 7, which is a block diagram of a client device 700 for use in system 100 of FIG. 1, in accordance with some embodiments of the presently disclosed subject matter. Client device 700 is an example of client device 150. Typical implementations of client device 700 include, for example, a tablet device, smartphone, desktop or portable computer, set-top box, Internet-enabled television, media center PC, or any other suitable device, such as is known in the art.

Client device 700 comprises at least one processor 710, a user interface (typically a graphical user interface, GUI) 720, an ABR player 730 for playing segments of content items, and memory 740. GUI 720 and ABR player 730 may comprise a single application, may be two applications which interact with each other, or the GUI may be part of a different application, such as a Web browser. Memory 740 may store instructions, which at least one of the processors 710 may execute, in order to perform method 300 described herein. Client device 700 may additionally or alternatively comprise other hardware, firmware and/or software components as are known in the art.

In some embodiments, CDN 140 comprises a plurality of distributed servers, located in a plurality of physical machines. Each physical machine includes memory and one or more respectable programmable processors implementing the respective server. The memory may store instructions, which at least one of the processor(s) may execute to perform the operations attributed to CDN 140 herein. CDN 140 also comprises one or more computer networks (e.g. the Internet, private network(s), etc.), implemented using any appropriate wired and/or wireless technology. CDN 140 may additionally or alternatively comprise other hardware, firmware and/or software components as are known in the art. In addition to or instead of CDN 140, one or more computer networks (e.g. the Internet, private network(s), etc.), implemented using any appropriate wired and/or wireless technology may transfer data between client device 150 and ABR encryptor 130 in system 100. The physical machines of CDN 140, and/or one or more other element(s) of system 100 (e.g. client device 150, physical machine(s) of ABR encryptor 130, etc.) may include, for example, network interface(s) suitable for the computer network(s). The computer network(s) may, for example, at least support one or more versions of the Hypertext Transfer Protocol (HTTP), e.g. HTTP 1.0, 1.1, 2, etc. Certain HTTP feature(s) such as compression during transfers, chunked transfers, etc. may be used, when appropriate, for data transfer (e.g. of playlist(s), URI(s), encrypted segment(s), etc.) via the computer network(s). Cryptographic protocol(s) such as Secure Sockets Layer, Transport Layer Security, etc. may be implemented, when suitable.

In some embodiments, clear content storage 114 includes memory for storing playlists, segments, etc. Clear content storage 114 may additionally or alternatively comprise other hardware, firmware and/or software components as are known in the art.

Some embodiments of the subject matter are advantageous in that ABR encryptor 130 does not need to have access to an ABR media playlist that specifies a segment in order to encrypt the segment (e.g. in accordance with method 400). It is noted that even if there is only one server comprised in ABR encryptor 130, encryption could still be problematic, if ABR encryptor 130 relied on an ABR media playlist stored in clear content storage 114 and/or stored internally in ABR encryptor 130, for obtaining the relevant encryption information, rather than on encryption metadata in the URI. Segments near the edge of a review buffer may have been specified in the ABR media playlist that was provided to client device 150/CDN 140 but may have disappeared from the ABR media playlist stored in clear content storage 114 and/or stored internally in ABR encryptor 130, if the stored ABR media playlist had been updated before ABR encryptor 130 is required to obtain the relevant encryption information for the segment. Additionally or alternatively, an update to the ABR media playlist stored in clear content storage 114 and/or stored internally in ABR encryptor 130 may include an update that would affect the relevant encryption/decryption information for the segment (e.g. due to a change in time of packaging the segment that would affect how the segment is specified in the stored ABR media playlist). In such a case, if ABR encryptor 130 relied on the ABR media playlist stored in clear content storage 114 and/or stored internally in ABR encryptor 130, ABR encryptor 130 would use different encryption information for encrypting the segment than would have been required prior to the update, and client device 150 would therefore be unable to decrypt the encrypted segment. Therefore, these embodiments of the subject matter are advantageous in enabling segment encryption to match segment decryption in accordance with key tag(s) provided in the ABR media playlist sent to client device 150/CDN 140, even when the sent ABR media playlist differs from the ABR media playlist stored in clear content storage 114 and/or stored internally in ABR encryptor 130, e.g. in terms of which segments are listed, specification of segments that are listed, etc.

Moreover, some embodiments of the subject matter are advantageous in that the pinning of the encryption metadata to the URI enables the ABR media playlist processing (e.g. in accordance with method 200) and segment encryption (e.g. in accordance with method 400) to be spread among a plurality of servers comprised in ABR encryptor 130, if such an arrangement is desired, without requiring communication between the servers. It is noted that communication (e.g. of relevant encryption information) between servers may be more difficult to synchronize when the relevant encryption information and decryption information are more dynamic, such as when such information is dependent on time in contrast to being dependent only on definition level. Scaling among a plurality of servers of ABR encryptor 130 may be less resource-intensive (e.g. cheaper), if no communication is required, allowing for ABR encryptor 130 to include many servers and relatively simple load-balancing (e.g. HTTP load balancing).

In an alternative solution, clear content storage 114 could use a big database so as to include every segment that packager/encoder 112 has generated. However such a solution requires a large amount of memory, compared to the solution provided by embodiments of the subject matter where encryption metadata is pinned a segment URI. In another alternative solution a separate ABR media playlist could be generated for the use of ABR encryptor 130 that specifies more segments than the ABR media playlist that is sent to client device 150 or CDN 140. However this solution requires more memory, compared to the solution provided by embodiments of the subject matter where encryption metadata is pinned a segment URI. In another alternative solution, assuming that ABR encryptor 130 comprises a plurality of servers, encryption metadata could be securely communicated among the servers, e.g. as configuration data. However, as discussed above such communication may be difficult to synchronize. It is noted that if there is a plurality of proxy servers, recording encryption metadata for each segment and sharing the encryption metadata among the various servers of ABR encryptor 130 may be complicated, adding multiple failure modes as either all requests must be serialized via a single database, or a clustered database is needed and cluster availability and partitioning must be considered. The solution provided by embodiments of the subject matter, where communication between servers of ABR encryptor 130 is not required, may allow for less-resource intensive scaling, including simpler load-balancing, compared to more resource intensive (e.g. expensive) and complicated clustering technologies. Other advantages of the subject matter are apparent from the description above.

The term "encoded" is used herein, in all of its grammatical forms, to refer to any type of data stream encoding including, for example, well known types of encoding such as MP3 encoding, MPEG-2 encoding, MPEG-4 encoding, H.264 encoding (also referred to as MPEG-4 part 10), H.265 encoding, AAC (Advanced Audio Coding) encoding, AC-3 encoding, enhanced AC-3 encoding, VC-1 encoding, synthetic encodings such as Scalable Vector Graphics (SVG) and LASER (ISO/IEC 14496-20), and so forth. It is appreciated that an encoded data stream generally requires more processing and typically more time to read than a data stream which is not encoded. Any recipient of encoded data, whether or not the recipient of the encoded data is the intended recipient, is, at least in potential, able to read encoded data without requiring cryptanalysis. It is appreciated that encoding may be performed in several stages and may include any number of different processes, including for example: compressing the data; transforming the data into other forms; and/or making the data more robust (for instance replicating the data or using error correction mechanisms). Similarly, the term "decoded" is used herein, in all of its grammatical forms, to refer to the reverse of "encoded" in all of its grammatical forms.

The term "encrypted", in all of its grammatical forms, is used herein to refer to any appropriate encryption methods for encrypting a data stream, and/or any other appropriate method for intending to make a data stream unintelligible except to an intended recipient(s) thereof. Well known types of encrypting include, for example, DES (Data Encryption Standard), 3DES, and AES (Advanced Encryption Standard). Similarly, the term "decrypted" is used herein, in all of its grammatical forms, to refer to the reverse of "encrypted" in all of its grammatical forms.

Suitable memory may vary depending on the embodiment, for example, depending on what is being stored in the memory, the length of storage, etc. In various embodiments, memory discussed herein may include memory that is volatile, non-volatile, for long term storage, for short term storage, optical memory, magnetic memory and/or electronic memory, etc.

Program code (also referred to as software, instructions, computer readable program code, etc.) that is discussed herein may be written in any appropriate language(s). The duration that program code remains embodied on a computer readable medium, may vary depending on the embodiment, for example depending on the type of program code, type of medium, type of element reading the program code, etc. The location of a storage medium embodying program code relative to any element (e.g. processor) which reads the program code may vary depending on the embodiment and may include any appropriate location (e.g. in the same physical machine, local, remote, etc.)

It will be appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present subject matter.

It will also be appreciated that the subject matter contemplates, for example, a computer program product comprising a computer readable medium having computer readable program code embodied therein for executing one or more methods and/or one or more parts of method(s) disclosed herein. Further contemplated, for example, are computer readable program code for executing method(s) and/or part(s) of method(s) disclosed herein; and/or a computer readable medium having computer readable program code embodied therein for executing method(s) and/or part(s) of method(s) disclosed herein.

It will additionally be appreciated that in the above description of example embodiments, numerous specific details were set forth in order to provide a thorough understanding of the subject matter. However, it will be understood by those skilled in the art that some examples of the subject matter may be practiced without these specific details. In other instances, well-known features have not been described in detail so as not to obscure the subject matter.

It will further be appreciated that various features of the subject matter which are, for clarity, described herein in the contexts of separate embodiments may also be provided in combination in a single embodiment. Conversely, various features of the subject matter which are, for brevity, described herein in the context of a single embodiment may also be provided separately or in any suitable subcombination.

It will yet further be appreciated by persons skilled in the art that the presently disclosed subject matter is not limited by what has been particularly shown and described hereinabove. Rather the scope of the subject matter is defined by the appended claims and equivalents thereof:

What is claimed is:

1. A method, comprising:
   obtaining a first uniform resource identifier for a segment of a content item;
   obtaining encryption metadata indicative of encryption information to be used for encrypting the segment when the segment is requested by a client device or a content delivery network;
   generating a data combination based on the first uniform resource identifier and the encryption metadata;
   generating an authentication code or a signature by applying a secret to the data combination, the secret being unknown to the client device or the content delivery network;
   generating a second uniform resource identifier for the segment based on the authentication code or the signature, the encryption metadata and the first uniform resource identifier;
   inserting the second uniform resource identifier in an adaptive bitrate media playlist for the content item; and
   sending the adaptive bitrate media playlist to the client device or the content delivery network.

2. The method of claim 1, wherein the adaptive bitrate media playlist is an HTTP Live Streaming media playlist.

3. The method of claim 1, wherein the adaptive bitrate media playlist is a live media playlist, wherein the encryption information is dependent on time, and wherein the encryption metadata includes a timestamp.

4. The method of claim 1, wherein the encryption information is dependent on one or more factors selected from a group comprising: time, content, authorization level, definition level, asset identifier, and location.

5. The method of claim 4, wherein the encryption metadata is derived from at least one of the one or more factors.

6. The method of claim 1, wherein the authentication code is a Hash-based Message Authentication Code.

7. The method of claim 1, wherein said obtaining the first uniform resource identifier includes: acquiring a source adaptive bitrate media playlist that lists a listed uniform resource identifier, the first uniform resource identifier being the listed uniform resource identifier or derived from the listed uniform resource identifier.

8. A method comprising:
   receiving a uniform resource identifier for a segment of a content item from a client device or a content delivery network, wherein the uniform resource identifier is indicative of encryption metadata, an authentication code or signature, and segment identification;
   determining the authentication code or the signature based on the uniform resource identifier, and validating the authentication code or the signature;
   determining the encryption metadata based on the uniform resource identifier, and using the encryption metadata to obtain encryption information;

determining the segment identification based on the uniform resource identifier, and using the segment identification to obtain the segment;

using the encryption information to encrypt the segment; and sending the segment, encrypted, to the client device or the content delivery network.

9. The method of claim 8, further comprising: not sending the segment to the client device or the content delivery network, if the authentication code or the signature is not validated.

10. The method of claim 8, wherein the uniform resource identifier was included in an adaptive bitrate media playlist that was sent to the client device or the content delivery network.

11. The method of claim 10, wherein the segment is encrypted by a different server than a server that inserted the uniform resource identifier in the adaptive bitrate media playlist.

12. A system comprising at least one processor adapted to:
obtain a first uniform resource identifier for a segment of a content item;
obtain encryption metadata indicative of encryption information to be used for encrypting the segment when the segment is requested by a client device or a content delivery network;
generate a data combination based on the first uniform resource identifier and the encryption metadata;
generate an authentication code or a signature by applying a secret to the data combination, the secret being unknown to the client device or the content delivery network;
generate a second uniform resource identifier for the segment based on the authentication code or the signature, the encryption metadata and the first uniform resource identifier;
insert the second uniform resource identifier in an adaptive bitrate media playlist for the content item; and
send the adaptive bitrate media playlist to the client device or the content delivery network.

13. The system of claim 12, wherein the at least one processor is further adapted to:
receive the second uniform resource identifier from the client device or the content delivery network;
determine the authentication code or the signature based on the second uniform resource identifier, and validate the authentication code or the signature;
determine the encryption metadata based on the second uniform resource identifier, and use the encryption metadata to obtain encryption information;
determine segment identification based on the second uniform resource identifier, and use the segment identification to obtain the segment; and
use the encryption information to encrypt the segment; and
send the segment, encrypted, to the client device or the content delivery network.

14. The system of claim 13, wherein the at least one processor is adapted to implement at least two servers, and wherein any of the at least two servers is adapted to perform at least one of: inserting the second uniform resource identifier in an adaptive bitrate media playlist for the content item prior to the adaptive bitrate media playlist being sent to the client device or the content delivery network, or using the encryption information to encrypt the segment after the second uniform resource identifier has been received from the client device or the content delivery network.

15. The system of claim 13, wherein the segment identification is the first uniform resource identifier.

16. The system of claim 12, wherein the adaptive bitrate media playlist is a live media playlist, wherein the encryption information is dependent on time, and wherein the encryption metadata includes a timestamp.

17. The system of claim 12, further comprising a client device adapted to send the second uniform resource identifier when requesting the segment.

18. The system of claim 12, further comprising a content delivery network adapted to send the second uniform resource identifier when requesting the segment.

19. The system of claim 18, wherein the content delivery network is further adapted to store the segment, encrypted.

20. The system of claim 12, further comprising a clear content storage adapted to store the segment, unencrypted, and adapted to store a source adaptive bitrate media playlist that lists a listed uniform resource identifier, wherein being adapted to obtain the first uniform resource identifier includes being adapted to acquire the source adaptive bitrate media playlist, and wherein the first uniform resource identifier is the listed uniform resource identifier or derived from the listed uniform resource identifier.

* * * * *